P. M. HAMLIN.
MEANS FOR RECOVERING BY-PRODUCTS.
APPLICATION FILED JUNE 11, 1908.
960,542.
Patented June 7, 1910.
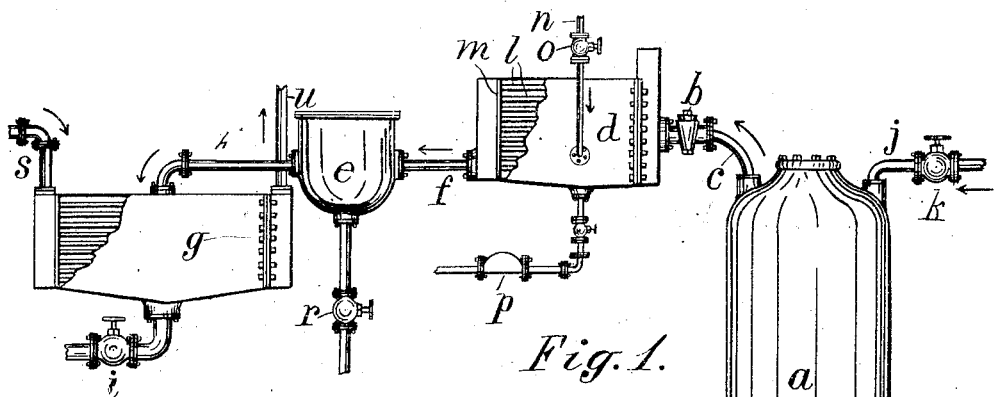
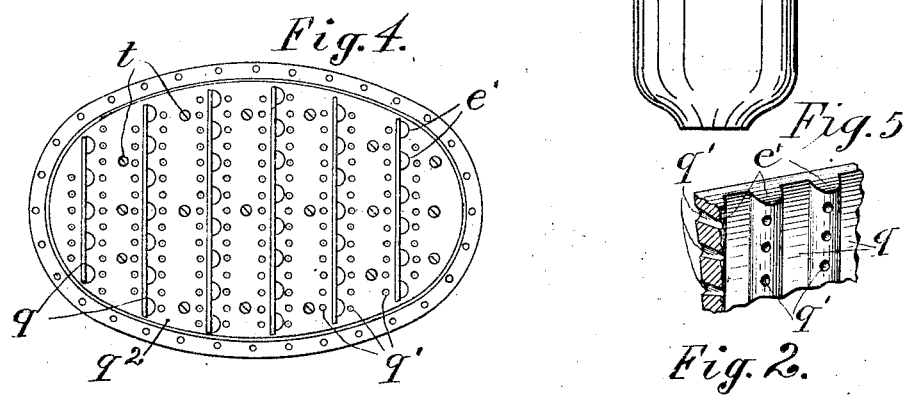
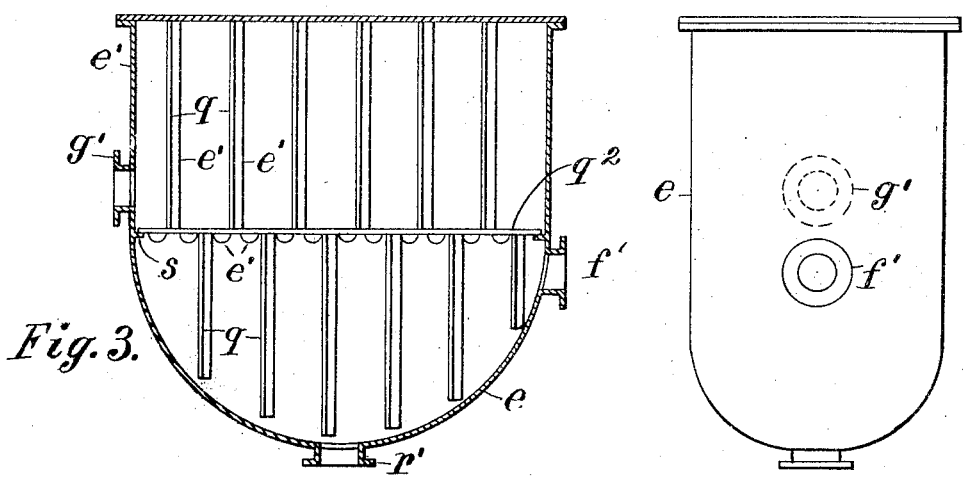
Witnesses:
L. Lee.
J. W. Greenbaum
Inventor:
Pulaski M. Hamlin,
per Thomas S. Crane, Atty.

UNITED STATES PATENT OFFICE.

PULASKI M. HAMLIN, OF PITTSTON, PENNSYLVANIA, ASSIGNOR OF ONE-HALF TO CHARLES H. UNVERZAGT, OF NEW YORK, N. Y.

MEANS FOR RECOVERING BY-PRODUCTS.

960,542.   Specification of Letters Patent.   Patented June 7, 1910.

Application filed June 11, 1908. Serial No. 437,927.

*To all whom it may concern:*

Be it known that I, PULASKI M. HAMLIN, a citizen of the United States, residing at Pittston, county of Luzerne, and State of Pennsylvania, have invented certain new and useful Improvements in Means for Recovering By-Products, fully described and represented in the following specification and the accompanying drawings, forming a part of the same.

This invention relates to a means of recovering volatile by-products from the treatment of wood-fiber or other crude materials in a cooker, digester, or roaster in which the crude material is heated to change its constitution, and the by-products are incidentally vaporized.

Where it is desired to maintain any pressure above the atmosphere during the treatment of the crude material, such pressure can be obtained and the by-products secured by discharging the vaporized by-products from the receptacle only as fast as they are generated, which is effected by any valve suitable for regulating and limiting the discharge flow.

The invention is partly adapted for the recovery of turpentine, oils, resin, and wood alcohol from wood during the manufacture of pulp without interfering with the pulp-making, or increasing its cost. In such manufacture of wood-pulp, a charge of wood-chips is placed in a tightly closed digester and is heated by injecting steam into the digester at a temperature above the boiling point of the by-products, which are thus necessarily vaporized.

In digesting coniferous woods to produce pulp, ingredients of greatly different character and density, as wood alcohol and resin, are discharged as by-products, and the object of the present invention is to first separate the heavier ingredients from the vapor in order that they may not clog the water-cooled condenser which is required to liquefy the more volatile elements.

Resin and heavy oils if condensed upon a chilled surface adhere strongly thereto and are liable to accumulate and clog up the vessel in which they are condensed so that its use cannot be continued without frequently opening it to remove these gummy substances. I have discovered that an air-cooled trap suffices to separate such heavier elements from the vapor, while it does not chill them sufficiently to prevent their spontaneous flow from the trap. I form the trap with perforated baffle-plates which afford an extended surface for the deposit of these gummy elements and the conveying of their heat to the atmosphere, the plates producing a deposit of these elements without preventing their flow and discharge from the trap at the temperature of the air which is always much below that of steam under pressure. That portion of the vapor which is uncondensed in the air-cooled trap is then treated in a surface condenser where tubes can safely be used as a cooling agent, because the elements condensed from the remaining vapor are of a fluid character and not liable to clog the passages between the pipes by adhesion thereto. The apparatus does not separate all the by-products from one another, but divides them into two very different classes which are adapted for very different subsequent treatment to dissociate them, as may be desired.

The discharge of vaporized by-products from the digesters during the cooking operation permits steam, watery vapor and crude materials to pass off with the vapor, and I therefore find it desirable to re-heat this vapor at a temperature higher than that in the digesters so as to fully volatilize all the watery vapor and any of the crude materials that have not been vaporized.

I find that the air-cooled trap and water-cooled condenser operate upon such doubly volatilized vapor more effectively, and I therefore provide a steam heater heated to a temperature above that at which the crude material is treated, and operating upon the by-products independently of the cooker, digester or roaster, where they are generated.

The invention will be understood by reference to the following description and reference to the drawing, in which—

Figure 1 is a diagrammatic representation of the apparatus; Fig. 2 is a side view of the air-cooled trap; Fig. 3 is a vertical section of the shell of such trap with the perforated baffle-plates therein; Fig. 4 is a plan of the trap and baffle-plates with the cover removed; and Fig. 5 is a perspective view of a portion of one of the baffle-plates, showing the perforated ribs.

$a$ designates a digester suitable for cooking wood fiber in making pulp, $b$ designates a vapor-regulating valve connected by the pipe $c$ with the digester near the top, for continuously discharging a restricted proportion of the vaporized by-products.

$d$ designates the heater to which the valve $b$ discharges the vapor; $e$ designates the trap or air-cooled condenser, connected with the outlet of the heater by a pipe $f$, and $g$ designates the water-cooled condenser connected with the trap $e$ by a pipe $h$, and having an outlet-pipe $i$ to draw off the finally liquefied products.

The digester $a$ is shown with a steam supply-pipe $j$ having a cock $k$ to regulate the influx of steam for cooking the crude material. The heater $d$ and condenser $g$ are represented with a construction similar to an ordinary tubular surface-condenser, the heater having tubes $l$ secured in heads $m$ which form chambers at opposite ends of the heater. The heater is shown fully in section and the condenser $g$ would be of similar construction, although its tubes are indicated in the drawing only by dotted lines.

A pipe $n$ with cock $o$ supplies steam or heating fluid to the space around the tubes in the heater for heating them, and a regulator or steam trap $p$ is connected with an outlet from such space to discharge the heating fluid as it is chilled. The by-products and steam from the digester pass through the tubes $l$ in which they are fully vaporized, and are discharged from the outlet of the heater into the condensing trap $e$ by the pipe $f$. This trap has no means of heating or chilling it, but is constantly cooled to a certain degree by the atmosphere, and is provided internally, as shown in Figs. 3 and 4, with numerous vertical baffle-plates which impede the progress of the vapor through the trap.

The baffle-plates are perforated with numerous holes and operate to chill the vapor in a certain degree as it passes through, while they collect upon their surface the heavier ingredients. Such heavier ingredients (in a vapor from coniferous wood fiber) consist of resin and heavy oils, which accumulate in the bottom of the trap and can be discharged at pleasure by a pipe having cock $r$.

The air-cooled trap $e$ may be located in any place which possesses an even temperature, and the baffle-plates are constructed with ribs $e'$ in which vent-holes $q'$ are formed, so that a considerable amount of heat-conducting metal surrounds each of the holes and operates to conduct the heat effectively from the vapor. The baffle-plates operate effectively to conduct the heat from the vapor to the casing or shell of the trap, and such shell dissipates or diffuses the heat into the atmosphere so that a certain cooling effect is constantly exerted upon the vapor passing through the trap.

Fig. 5 clearly shows the penetration of the holes $q'$ through the ribs and the integral connection of the ribs with the plates $q$; but Fig. 3 shows only the edges of the baffle-plates and does not exhibit them in section, as only the shell $e$ of the trap is cut open.

The preferred construction for the trap is shown in Figs. 3 and 4, with a horizontal partition or baffle-plate $q^2$, and the vapor-inlet $f'$ and vapor-outlet $g'$ connected respectively below and above such plate. The horizontal baffle-plate is employed to separate the entering vapors from those leaving the trap, the inlet $f$ being inserted below such horizontal baffle-plate so that the liquid first condensed may find immediate access to the discharge-opening $r'$ in Fig. 3. The horizontal baffle-plate is shown perforated, and resting upon ledges $s$ inside the shell of the trap, and the vertical baffle-plates $q$ are shrown attached, by the upper or lower end, to such horizontal plate by screws $t$ and extended upwardly and downwardly, only the screws that extend downwardly being indicated in the drawing.

The extremities of the plates which extend downwardly are arranged to clear the shell of the trap so that the condensed liquid may flow freely to the discharge-opening $r'$. The upper vertical baffle-plates are set intermediate to the lower ones, and the vent-holes through the horizontal baffle-plates $q^2$ lie between the adjoining edges of the upper and lower plates so that the vapors when obstructed by one of the vertical plates can pass through the horizontal plate as well as through such vertical plate.

The horizontal baffle-plate is of special importance in the construction, as it tends to retain the vapors adjacent to the discharge-opening $r'$ while separating the greater part of the denser elements; but the location of the vapor-outlet $g'$ compels all the vapors to pass through the horizontal plate to reach such outlet.

The vapor from the digester is heated far above the atmospheric temperature in the heater $d$, and when flowing past the air-cooled baffle plates, the heavier elements are condensed and flow freely from the opening $r'$.

The condenser $g$ is shown as a tubular surface-condenser of the same construction as the heater; but the tubes are subjected to the cooling action of a circulating fluid introduced into the tubes at one end by the pipe *s* and discharged at the other end by a pipe *t*.

The pipe *h* leads the lighter ingredients of the by-products from the condensing trap *e* into the space around the tubes, where such ingredients are liquefied and can be drawn off by the pipe *i* having a cock to regulate the outflow.

With this arrangement, any heavy ingredients that may enter this condenser cannot clog the tubes, as they do not pass through the same. It is immaterial what construction be employed for the heater *d* and condenser *g*, to perform the same functions.

From the above description it will be seen that the so-called trap *e* forms the first condenser, which is merely air-cooled; and thus at a temperature materially below that of the vapor, although considerably above that of the condenser *g*, which is artificially cooled by a current of water or other suitable means. The temperature of the condenser *g* is, in practice, much below that of the atmosphere, and the heat is abstracted from the vapor more rapidly than in an air-cooled condenser like the trap *e*.

In treating the by-products from a pulp-digester, the use of an air-cooled trap or condenser *e* serves to remove the heavy oils and resin from the vapor before it enters the final condenser *g*, and thus prevents such elements from clogging the condenser, in which the low temperature would harden the resin and prevent its flow and discharge.

The complete separation of the lighter and heavier ingredients is effectively secured by the use of the heater *d*, which insures the complete volatilization of the steam and various ingredients carried over therewith from the digester, and thus adapts them more perfectly to be separated by condensation at two different temperatures.

Having thus set forth the nature of the invention what is claimed herein is:

1. The means for recovering by-products from wood-chips and fibrous material in an intermittent process in which the by-products are vaporized, consisting of a digester containing a charge of crude material and having steam supplied thereto at a temperature suitable to distil the volatile elements therefrom, a valve discharging from such digester a limited proportion of the steam with by-products vaporized therein, and operated to maintain a steam pressure in the digester suitable for digesting the fiber, a heater with means for maintaining it at a higher temperature than the digester and operating to further volatilize all of such vaporized by-products, an air-cooled trap receiving such doubly volatilized by-products and provided with perforated baffle-plates to arrest the heavier ingredients, and a water-cooled condenser receiving the lighter by-products from the air-cooled trap and operating to liquefy the same.

2. The means for recovering by-products from a process in which they are vaporized, consisting of a digester heated by injected steam to a certain temperature, a valve discharging from such digester a limited proportion of such steam with by-products vaporized therein, a tubular heater having the tubes heated by steam to a higher temperature than the digester, the said vaporized by-products being heated by the tubes to fully volatilize the whole of such by-products, an air-cooled trap receiving such doubly volatilized by-products from such heater and provided with perforated baffle-plates to arrest the heavier ingredients and with means for drawing off such ingredients, and a tubular condenser receiving upon the outside of the tubes the remainder of the vaporized products from the trap, the condenser having a cooling fluid circulated through the tubes to chill them, whereby the remainder of the by-products is reduced to a liquid form outside of the tubes, where they cannot clog the tubes.

3. In the manufacture of wood pulp, the combination, with a digester having a charge of wood chips with steam supplied thereto and a valve discharging from such digester a limited proportion of such steam with by-products vaporized from the wood fiber, of a heater with means for heating the same above the boiling temperature of such by-products and operated to fully volatilize all of such by-products, an air-cooled trap receiving such doubly volatilized products and provided with perforated baffle-plates to collect the resin and heavy oils, and a water-cooled condenser receiving the remainder of such by-products and operating to liquefy the same, substantially as herein set forth.

4. In the manufacture of wood pulp, the combination, with a digester having a charge of wood chips and steam supplied thereto and a valve discharging from such digester a limited proportion of such steam with by-products vaporized from the wood fiber, of a trap having a casing *e* with perforated baffle-plates therein forming a succession of chambers through which the vapor is passed, the baffle-plates conducting heat to the casing and the casing diffusing the heat in the atmosphere, and the baffle-plate thus operating to separate the heavier elements from the vapor.

5. In the manufacture of wood pulp, the combination, with a digester having steam supplied thereto and a valve discharging from such digester a limited proportion of such steam with by-products vaporized from the wood fiber, of an air-cooled trap $e$ having discharge-opening at the bottom, and a horizontal perforated baffle-plate with a vapor-inlet $f'$ connected below the same, a vapor-outlet $g'$ connected above the same, and vertical baffle-plates projected upwardly and downwardly from the horizontal plate, the said baffle-plates being provided with perforated ribs, as and for the purpose set forth.

In testimony whereof I have hereunto set my hand in the presence of two subscribing witnesses.

PULASKI M. HAMLIN. [L. S.]

Witnesses:
JAMES D. BYRNE,
HORACE W. HARPER.